(12) United States Patent
Kim et al.

(10) Patent No.: US 10,174,502 B2
(45) Date of Patent: Jan. 8, 2019

(54) MULTIPLE SUPPORT WALL STRUCTURE

(71) Applicant: Chung Gi Kim, Seoul (KR)

(72) Inventors: Chung Gi Kim, Seoul (KR); Il Jin Park, Seoul (KR); Joo Seok Oh, Busan (KR)

( * ) Notice: Subject to any disclaimer, the term of this patent is extended or adjusted under 35 U.S.C. 154(b) by 0 days.

(21) Appl. No.: 15/507,096

(22) PCT Filed: Nov. 24, 2015

(86) PCT No.: PCT/KR2015/012609
§ 371 (c)(1),
(2) Date: Feb. 27, 2017

(87) PCT Pub. No.: WO2016/085220
PCT Pub. Date: Jun. 2, 2016

(65) Prior Publication Data
US 2017/0284094 A1    Oct. 5, 2017

(30) Foreign Application Priority Data
Nov. 27, 2014    (KR) .......................... 10-2014-0167412

(51) Int. Cl.
*E04C 2/34*        (2006.01)
*E04B 1/90*        (2006.01)
(Continued)

(52) U.S. Cl.
CPC .................. *E04C 2/34* (2013.01); *E04B 1/90* (2013.01); *E04C 2/32* (2013.01); *E04C 2/365* (2013.01);
(Continued)

(58) Field of Classification Search
CPC .... E04C 2/34; E04C 2/365; E04C 2002/3411; E04C 2002/3472; B32B 3/12
(Continued)

(56) References Cited

U.S. PATENT DOCUMENTS 4,348,442 A * 9/1982 Figge .................. B32B 3/30
                                                    428/72
4,495,237 A * 1/1985 Patterson ............ B32B 3/28
                                                    428/178
(Continued)

FOREIGN PATENT DOCUMENTS

KR        10-0456385 B1    11/2004
KR    10-2009-0114107 A    11/2009
KR    10-2014-0058432 A     5/2014

OTHER PUBLICATIONS

International Search Report dated Mar. 9, 2016 issued in corresponding PCT/KR2015/012609 application (2 pages).
(Continued)

Primary Examiner — Joshua K Ihezie
(74) Attorney, Agent, or Firm — Millen, White, Zelano & Branigan, PC

(57) ABSTRACT

A multiple support wall structure according to the present invention includes: a pair of top and bottom support plates that has a plurality of rectangular projective islands separated by lattice-shaped projections protruding in the shape of a go board, and protruding upward in the opposite direction to the lattice-shaped projections; and a intermediate reinforcing plate that is disposed between the top and bottom support plates, has upward projective insertions protruding in a shape corresponding to the rectangular islands to be fitted in the rectangular islands of the top support plate, has top grooves formed laterally and longitudinally between the upward projective insertions to fit the lattice-shaped projections, has downward projective insertions formed in the same shape as but in the opposite direction to the upward projective insertions in spaces diagonally adjacent to the upward projective insertions, and has bottom grooves formed laterally and longitudinally between the downward projective insertions.

4 Claims, 16 Drawing Sheets

(51) Int. Cl.
*E04C 2/32* (2006.01)
*E04C 2/36* (2006.01)
*B32B 3/12* (2006.01)

(52) U.S. Cl.
CPC ......... *B32B 3/12* (2013.01); *E04C 2002/3411* (2013.01); *E04C 2002/3472* (2013.01)

(58) Field of Classification Search
USPC ..... 52/783.1, 783.11, 783.17, 784.14, 793.1, 52/793.11
See application file for complete search history.

(56) References Cited

U.S. PATENT DOCUMENTS

| | | | | |
|---|---|---|---|---|
| 5,030,501 A * | 7/1991 | Colvin | ................ | B65D 65/406 428/178 |
| 5,270,092 A * | 12/1993 | Griffith | .................... | B32B 3/12 428/69 |
| 5,543,204 A * | 8/1996 | Ray | .......................... | B32B 3/28 428/179 |
| 6,003,283 A * | 12/1999 | Hull | ....................... | E04C 2/365 52/783.15 |
| 6,176,065 B1 * | 1/2001 | Honda | .................... | E02B 11/00 52/783.15 |
| 6,713,008 B1 * | 3/2004 | Teeter | ................... | B29C 70/025 264/240 |
| 7,010,897 B1 * | 3/2006 | Kuppers | ............... | E04C 2/3405 52/783.1 |
| 7,591,114 B2 * | 9/2009 | Herron, III | ............... | E04C 2/32 428/116 |
| 8,381,471 B2 * | 2/2013 | Kobre | ...................... | B32B 3/00 206/523 |
| 8,426,010 B2 * | 4/2013 | Stadthagen-Gonzalez | .................. | E04C 2/326 428/116 |
| 9,126,387 B2 * | 9/2015 | Straza | ....................... | B32B 3/28 |
| 9,925,736 B2 * | 3/2018 | Cox | ......................... | B32B 3/28 |
| 2014/0127454 A1 * | 5/2014 | Kuppers | ................ | B23K 20/10 428/116 |

OTHER PUBLICATIONS

English Machine Translation of KR 20-0402348 Y1 published Nov. 29, 2005.
English Machine Translation of KR 10-2009-0114107 A published Nov. 3, 2009.

* cited by examiner

MULTIPLE SUPPORT WALL STRUCTURE

TECHNICAL FIELD

The present invention relates to a multiple support wall structure and, more particularly, to a multiple support wall structure in which an intermediate reinforcing plate and outer top and bottom support plates are combined on both sides of the intermediate reinforcing plate by upward and downward projective insertions of the intermediate reinforcing plate and lattice-shaped projections and rectangular islands of the top and bottom support plates, so applied load is distributed by the upward and downward projective insertions, the lattice-shaped projections, and the rectangular islands, which are fitted to each other to make many contact sides, and large load is distributed by the contact areas, thereby improving the ability to distribute and resist applied load; and the structure is assembled only by fitting without specific machining, so installation is simple, an installation period is reduced, and carrying and installing are easy due to light weight; and many spaces are formed in the multiple structure, an insulation effect is high, soundproof or sound-blocking effect is improved, and the strength is also high.

BACKGROUND ART

In general, plate-shaped support wall structures, as known from DE-OS 197 48 192.2, have honeycomb structures and are made of paper or pulp. According to such a honeycomb structure, the cover plate is supported by vertical middle walls, so the structure is stable and the weight is small. Plate-shaped support wall structures are generally used for doors, internal structures, and outdoor market structures, etc. However, such plate-shaped support wall structures are weak to humidity.

Further, a sandwich support wall structure is described in DE-OS 19 22 693.8. The sandwich support wall structure has a honeycomb structure composed of two cover plates and walls disposed between the cover plates to make compartments. In this support wall structure, the two cover plates are connected by welding or soldering and the soldering material is distributed uniformly up to the edges of the compartments, so the cover plates are strongly connected to the honeycomb structure. Accordingly, the edges of the compartments are strong, but the walls are supported by the cover plates, so the stability of this hard honeycomb structure fully depends on the cover plates and the stability at the core part of the sandwich support wall structure is small enough to be negligible. Further, there is another defect that the manufacturing cost is high and synthetic materials cannot be used.

A invention, titled "Lightweight construction element in the form of a hollow body contoured honeycomb structure", has been proposed in PCT/DE2000/01683, but according to this structure, plates are molded, the molded plates undergo precision machining such as cutting, and a process for bonding the semi-finished products that have undergone the precision machining for assembly is performed, so a large amount of manpower and work time is required.

DISCLOSURE

Technical Problem

In order to solve this problem, an object of the present invention is to provide a multiple support wall structure, in which an intermediate reinforcing plate and top and bottom support plates to be fixed to both sides of the intermediate reinforcing plate are combined by applying an adhesive to upward and downward projective insertions of the intermediate reinforcing plate and lattice-shaped projections and rectangular islands of the top and bottom support plates, and then fitting them to each other, so applied load is distributed by the upward and downward projective insertions, the lattice-shaped projections, and the rectangular islands, which are fitted to each other to make many contact sides, and large load is distributed by the contact areas, thereby improving the ability to distribute and resist applied load; and the structure is assembled only by fitting without specific machining, so installation is simple, an installation period is reduced, and carrying and installing are easy due to light weight; and many spaces are formed in the multiple structure, an insulation effect is high, soundproof or sound-blocking effect is improved, and the strength is also high.

Technical Solution

The object of the present invention is achieved by a multiple support wall structure according to the present invention which includes: a pair of top and bottom support plates that has a plurality of rectangular projective islands separated by lattice-shaped projections protruding in the shape of a go board, and protruding upward in the opposite direction to the lattice-shaped projections; and a intermediate reinforcing plate that is disposed between the top and bottom support plates, has upward projective insertions protruding in a shape corresponding to the rectangular islands to be fitted in the rectangular islands of the top support plate, has top grooves formed laterally and longitudinally between the upward projective insertions to fit the lattice-shaped projections, has downward projective insertions formed in the same shape as but in the opposite direction to the upward projective insertions in spaces diagonally adjacent to the upward projective insertions, and has bottom grooves formed laterally and longitudinally between the downward projective insertions.

Advantageous Effects

According to the multiple support wall structure of the present invention, the structure includes: the top and bottom support plates that have a plurality of rectangular projective islands and flat cross projections protruding in an assembly direction and formed at the centers of the rectangular islands; and an intermediate reinforcing plate that is inserted between the top and bottom support plates, has upward and downward projective insertions formed to fit the flat cross projections of the top and bottom support plates, and has top and bottom grooves formed laterally and longitudinally between adjacent upward and downward projective insertions. The intermediate reinforcing plate and the top and bottom support plates are combined on both sides of the intermediate reinforcing plate by the upward and downward projective insertions and the rectangular islands. Accordingly, applied load is distributed by the portions fitted to each other, thereby improving the ability resist load. Further, the structure is assembled only by fitting without specific machining, so installation is simple, an installation period is reduced, the weight is small, and many spaces are formed in the multiple structure, whereby an insulation effect is high, soundproof or sound-blocking effect is improved, and the strength is also high.

BEST MODE

Figure 1A:
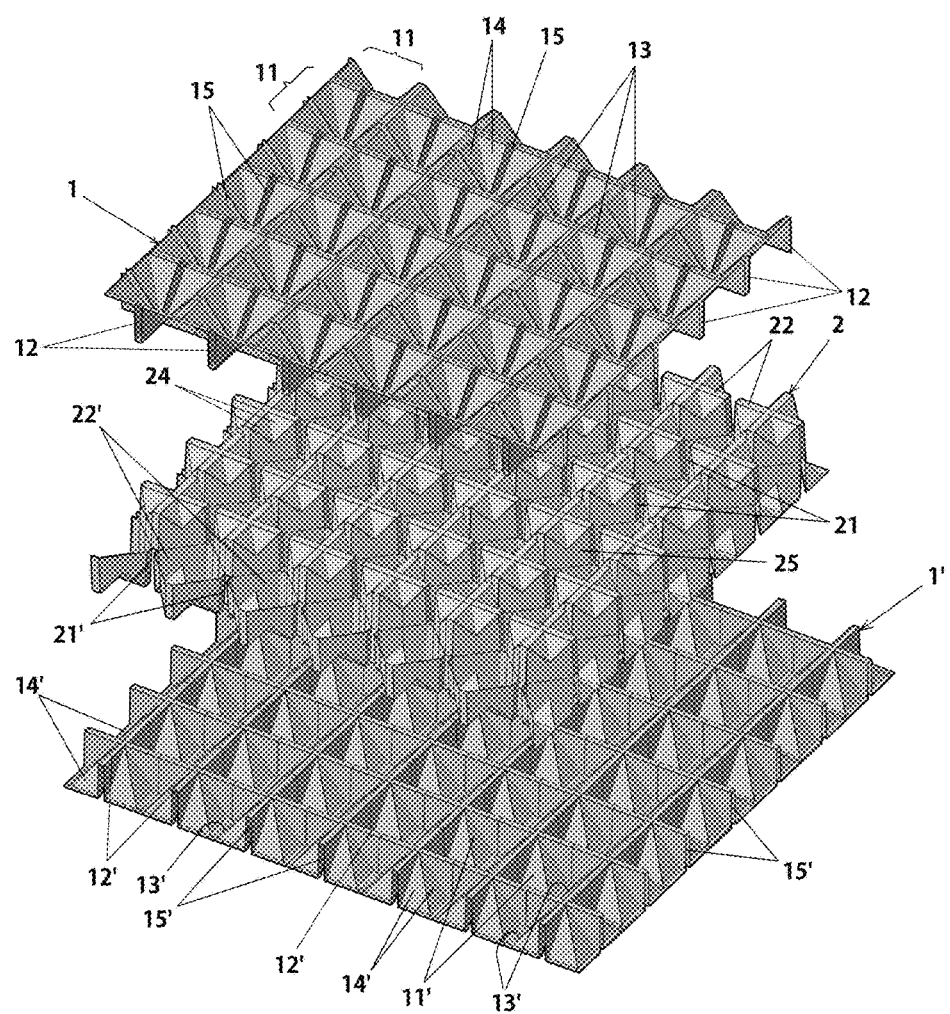
FIG. 1A is an exploded perspective view of a multiple support wall structure according to a first embodiment of the present invention and FIG. 1B is an enlarged perspective views of the top and the bottom of a rectangular projective island, which shows in detail the rectangular projective island and lattice-shaped projections.

A multiple support structure A according to a first embodiment of the present invention includes: a top support plate 1 that has a plurality of rectangular projective islands separated by lattice-shaped projections 12 protruding in the shape of a go board, and protruding upward in the opposite direction to the lattice-shaped projections 12; an intermediate reinforcing plate 2 that has upward projective insertions 22 protruding in a shape corresponding to the rectangular projective islands 11 to be inserted in the rectangular projective islands 11 of the top support plate 1, has top grooves 21 formed laterally and longitudinally between the upward projective insertions 22 to insert the lattice-shaped projections 12, has downward projective insertions 22' formed in the same shape as but in the opposite direction to the upper projective insertions 22 in spaces diagonally adjacent to the upper projective insertions 22, and has bottom grooves 21' formed laterally and longitudinally between the downward projective insertions 22'; and a bottom support plate 1' that has a plurality of rectangular projective islands 11' separated by lattice-shaped projections 12' protruding in the shape of a go board, and protruding downward in the opposite direction to the lattice-shaped projections 12' to be fitted on the downward projective insertions 22'.

The top support plate 1 and the bottom support plate 1' are arranged in opposite direction, but have the same shape, so the top support plate 1 will be mainly described hereafter.

Figure 1B:
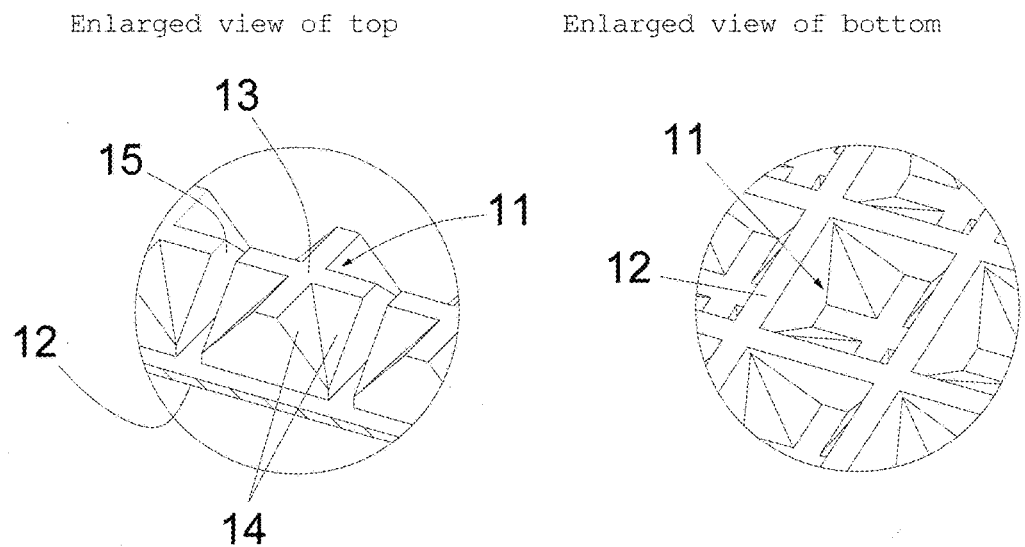
Figure 2:
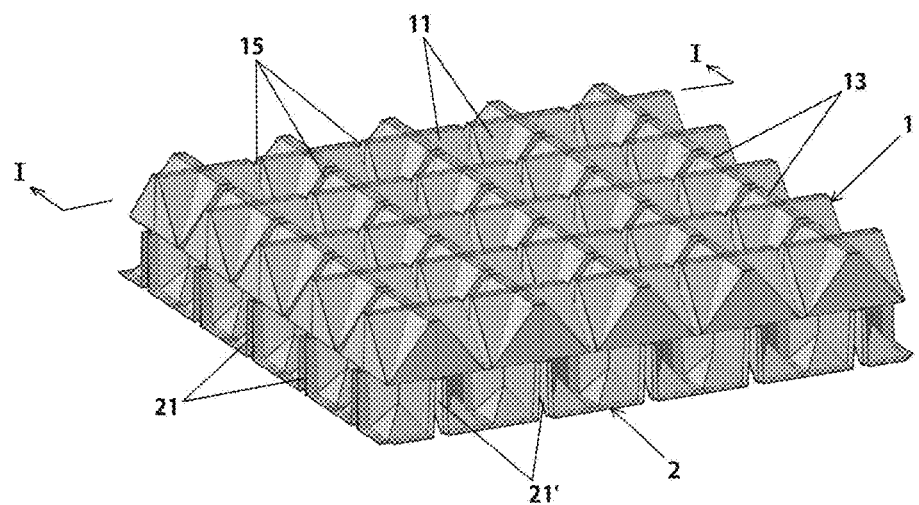
FIG. 2 is a perspective view of the multiple support wall structure according to the first embodiment of the present invention.

The rectangular island protruding upward on the top support plate 1, as shown in FIG. 1B, is separated by the lattice-shaped projections 12, a flat cross projection 13 is formed on the top of the rectangular island 11 on the top support plate 1, and slopes 14 are formed toward the edges of the rectangular island 11 at the sides of the flat cross projection 13, so the rectangular island 11 has eight slopes 14 inclined upward.

In the intermediate reinforcing plate 2, the upward projective insertions 22 protruding upward are separated by the top grooves 21 formed laterally and longitudinally between the upward projective insertions 22 and receiving the lattice-shaped projections 12, flat cross projections 23 protruding in a shape corresponding to the flat cross projections 13 except the edges are formed on the upward projective insertions 22 to fit the flat cross projections 13 on the top of the rectangular islands 11, and slopes 24 inclined toward the edges are formed at the sides of the flat cross projections 23, so that eight slopes 24 inclined upward are formed at each of the upward projective insertions 22 and the four outer sides of the upward projective insertions 22 are formed in a diamond shape when the upward projective insertions 22 are seen from above.

Accordingly, the upward and downward projective insertions 22 and 22' protruding upward and downward, respectively, on the intermediate reinforcing plate 2 are formed such that the diamonds are repeatedly and alternately formed.

Therefore, the downward projective insertions 22' protruding downward on the intermediate reinforcing plate 2 are formed in a direction opposite to that of the upward projective insertions 22, but have the same shape as the upward projective insertions 22, so they are not described in detail.

In this embodiment, the top and bottom support plates 1 and 1' are used in pairs, have the same configuration, and are coupled to both sides of the intermediate reinforcing plate 2, respectively, but only one of the top and bottom support plates may be used, if necessary.

The top support plate 1 is formed by molding plastic resin into a thickness of about 0.7 mm in this embodiment, but the thickness of the synthetic resin is just an example and it may be possible to mold the synthetic resin into a thickness of 0.3~2 mm, depending on the use or strength. In particular, it may be possible to use not only synthetic resin, but a paper plate made of pulp or metallic plate, and a combined configuration in which the intermediate reinforcing plate 2 is made of synthetic resin and the top and bottom plates 1 and 1' are paper plate or metallic plate may be used for convenience.

Lattice-shaped grooves 15 are formed on the top of the top support plate 1 to correspond to the lattice-shaped projections 12, and a pair of finish plates 3 having a plurality of projective insertions 31 that is inserted in the lattice-shaped grooves 15 may be fixed to finish the top of the top support plate 1, but flat finish plates 3 may be attached to the tops of the flat cross projections 13.

Projective insertions 31 are longitudinally formed on one of the finish plates 3 fixed to the top support plate 1 and projective insertions 31 are laterally formed on the other finish plate 3, so applied weight can be distributed.

The finish plates 3 are made of synthetic resin, but the material is not limited thereto and stone or metal may be used.

The intermediate reinforcing plate 2 is disposed between the pair of top and bottom support plates 1 and 1' in this way.

Figure 3:
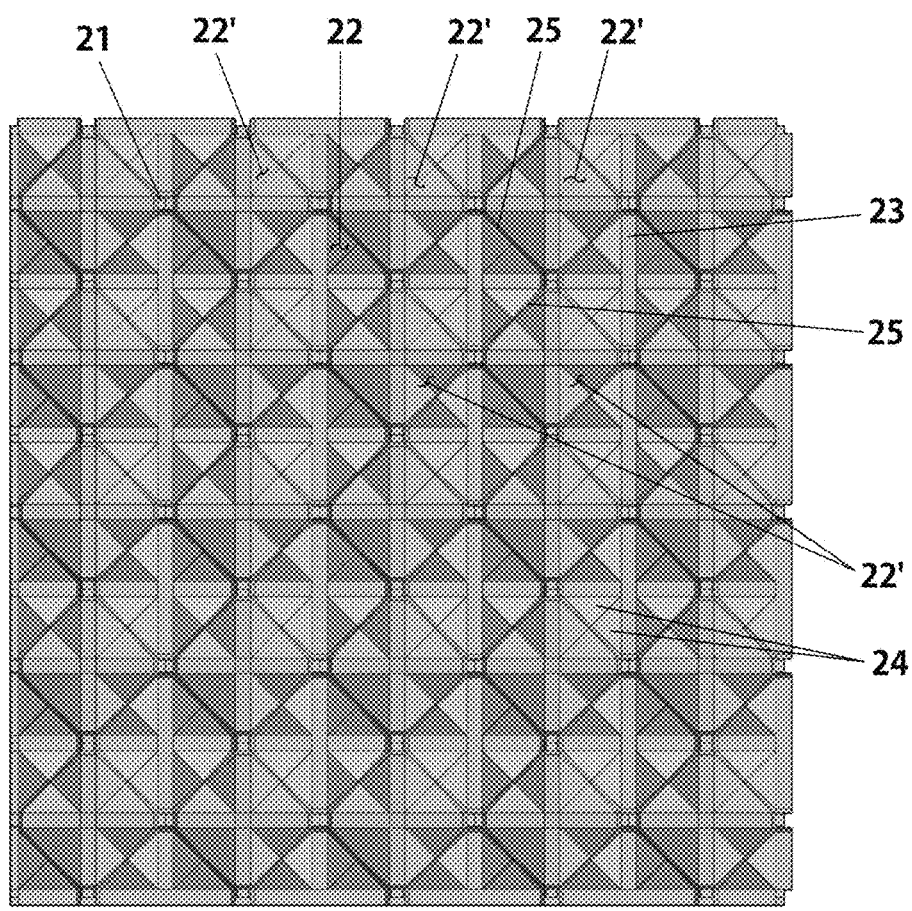
FIG. 3 is a perspective view of an intermediate reinforcing plate of the multiple support wall structure according to the first embodiment of the present invention.

The intermediate reinforcing plate 2 is inserted between the top and bottom support plates 1 and 1', the top grooves 11 are arranged to correspond to the gaps of the lattice-shaped projections 12 of the top support plate 1, the upward projective insertions 22 are sequentially formed between adjacent top grooves 21 and protrude as high as the lattice-shaped projections 12, and as shown in FIG. 3, the downward projective insertions 22' are formed in the opposite direction between the upward projective insertions 22 in the same shape as the upward projective insertions 22.

The downward projective insertions 22' protruding in the opposite direction, but in the same shape as the upward projective insertions 22 are formed on the opposite side to the upward projective insertions 22 of the intermediate reinforcing plate 2, and the upward projecting insertions 22 and the downward projective insertions 22' are formed in the opposite directions, but in the same shape to fix the top and bottom plates 1 and 1' disposed opposite to each other. Accordingly, they are differentiated by marks ", ', and ", but are given the same number and have the same function.

In this embodiment, the intermediate reinforcing plate 2 is formed by molding synthetic resin with a thickness of about 0.4 mm. The thickness of the synthetic resin is just an example and it may be possible to mold the synthetic resin into a thickness of 0.3~2 mm, depending on the use or strength. In particular, it may be possible to use not only synthetic resin, but a paper plate made of pulp or metallic plate, and a combined configuration in which the intermediate reinforcing plate 2 is made of synthetic resin and the top and bottom plates 1 and 1' are paper plate or metallic plate may be used for convenience.

The operational effect of the multiple support structure A according to the first embodiment of the present invention having this configuration is described in detail hereafter.

First, an adhesive is applied to the coupling portions of the top and bottom support plates 1 and 1' and the intermediate reinforcing plate 2 to be assembled and the lattice-shaped projections 12 of the top and bottom support plates 1 and 1' are inserted into the grooves 21 and 21' on the top and bottom of the intermediate reinforcing plate 2. When the lattice-shaped projections 12 of the top and bottom support plates 1 and 1' are inserted in the top and bottom grooves 21 and 21' of the intermediate reinforcing plate 2, they are in contact with the bottoms of the flat cross projections 13 on the top of the rectangular islands 11 of the top and bottom support plates 1 and 1', whereby the tops of the flat cross projections 23 are brought in contact with each other.

As described above, in the multiple support wall structure A according to the first embodiment of the present invention, the top and bottom support plates 1 and 1' and the intermediate reinforcing plate 2 are combined by fitting the lattice-shaped projections 12 of the top support plate 1 into the top and bottom grooves 21 and 21' of the intermediate reinforcing plate 2, in which the upward and downward projective insertions 22 and 22' of the intermediate reinforcing plate 2 are inserted in the rectangular islands 11 of the top and bottom support plates 1 and 1', and the flat cross projections 13 and the flat cross projections 23 of the intermediate reinforcing plate 2 are in surface contact with each other. Accordingly, many surface contact areas are made, so even if large load is applied to the multiple support wall structure A, the load is distributed by the many surface contact portions and the structure can resist large load.

Figure 4A:
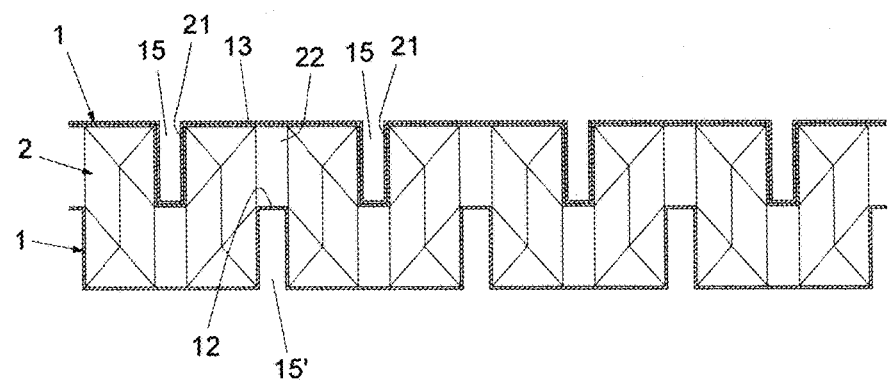
FIG. 4A is a schematic vertical cross-sectional view taken along line I-I in FIG. 2

That is, in detail, according to the multiple support wall structure according to the first embodiment of the present invention, as shown in FIG. 4A, the lattice-shaped projections 12 of the top and bottom support plates 1 and 1', which are separate parts, and the top and bottom grooves 21 and 21' of the intermediate reinforcing plate 2 are in surface contact with each other; the slopes 14 of the rectangular islands 11 of the top and bottom support plates 1 and 1' and the slopes 24 of the upward and downward projective insertions 22 and 22' of the intermediate reinforcing plate 2 are in surface contact with each other; and the flat cross projections 13 on the tops of the rectangular islands 11 of the top and bottom support plates 1 and 1' are in surface contact with the flat cross projections 23 of the upward and downward projective insertions 22 and 22' of the intermediate reinforcing plate 2, so surface contact is made at many portions. Accordingly, even if large load is applied to the multiple support wall structure A, the load can be distributed by the surface contact portions. As described above, the multiple support wall structure A according to the first embodiment of the present invention is assembled only by fitting the top and bottom support plates 1 and 1' and the intermediate reinforcing plate 2 without specific machining, so installation is simple and installation time is short. Accordingly, manpower for installation is considerably saved, so the installation costs are also reduced.

Figure 4B:
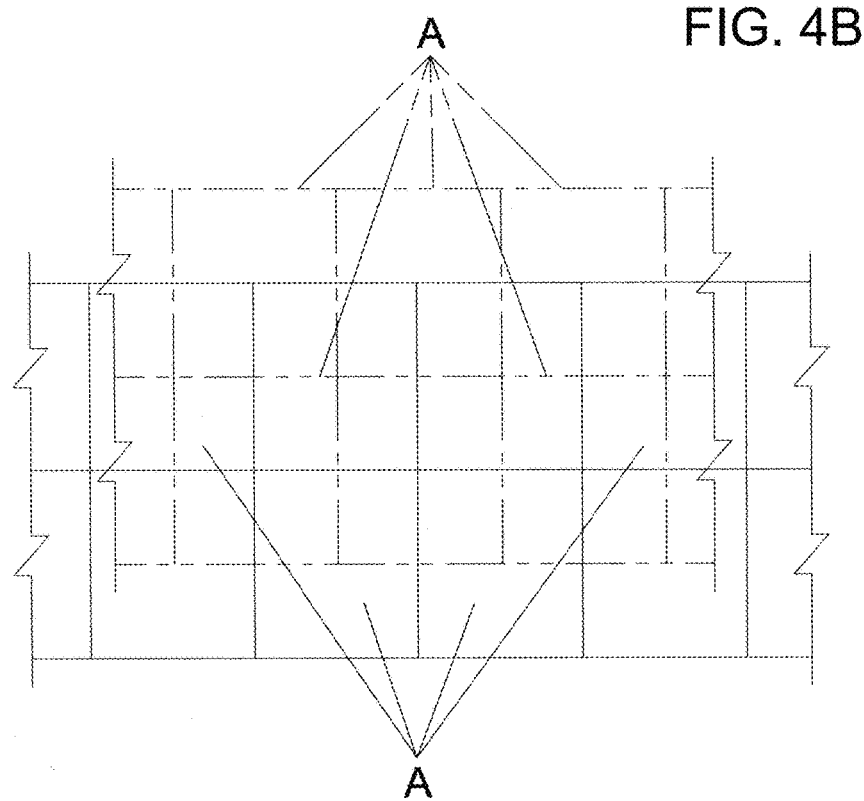
FIG. 4B is a front view schematically showing a method of installing the multiple support wall structure according to the first embodiment of the present invention.

As shown in FIG. 4B, for example, a plurality of multiple support wall structures A according to the first embodiment of the present invention is each assembled in a size of 1 m width and 1.5 m length and laterally sequentially arranged at the positions indicated by solid lines. Further, a plurality of multiple support wall structures A is laterally arranged to overlap the above arrangement at the positions indicated by two-dot chain lines at the middle portion, so indefinite expansion can be sequentially achieved to acquire necessary spaces. Accordingly, limits in installation space can be removed and they can be installed in a wide area.

Figure 5A:
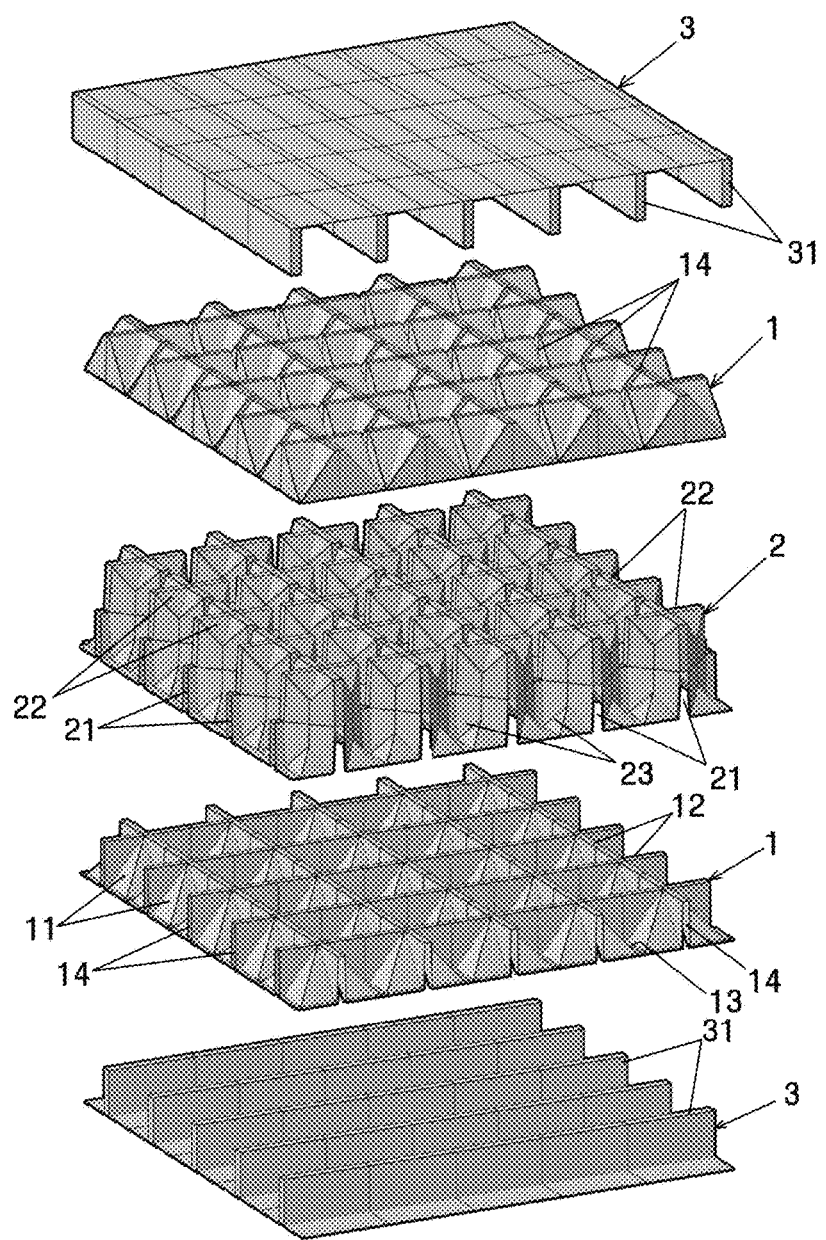
FIG. 5A is an exploded perspective view showing finish plates having insertions to fixed to the multiple support wall structure according to the first embodiment of the present invention.
Figure 5B:
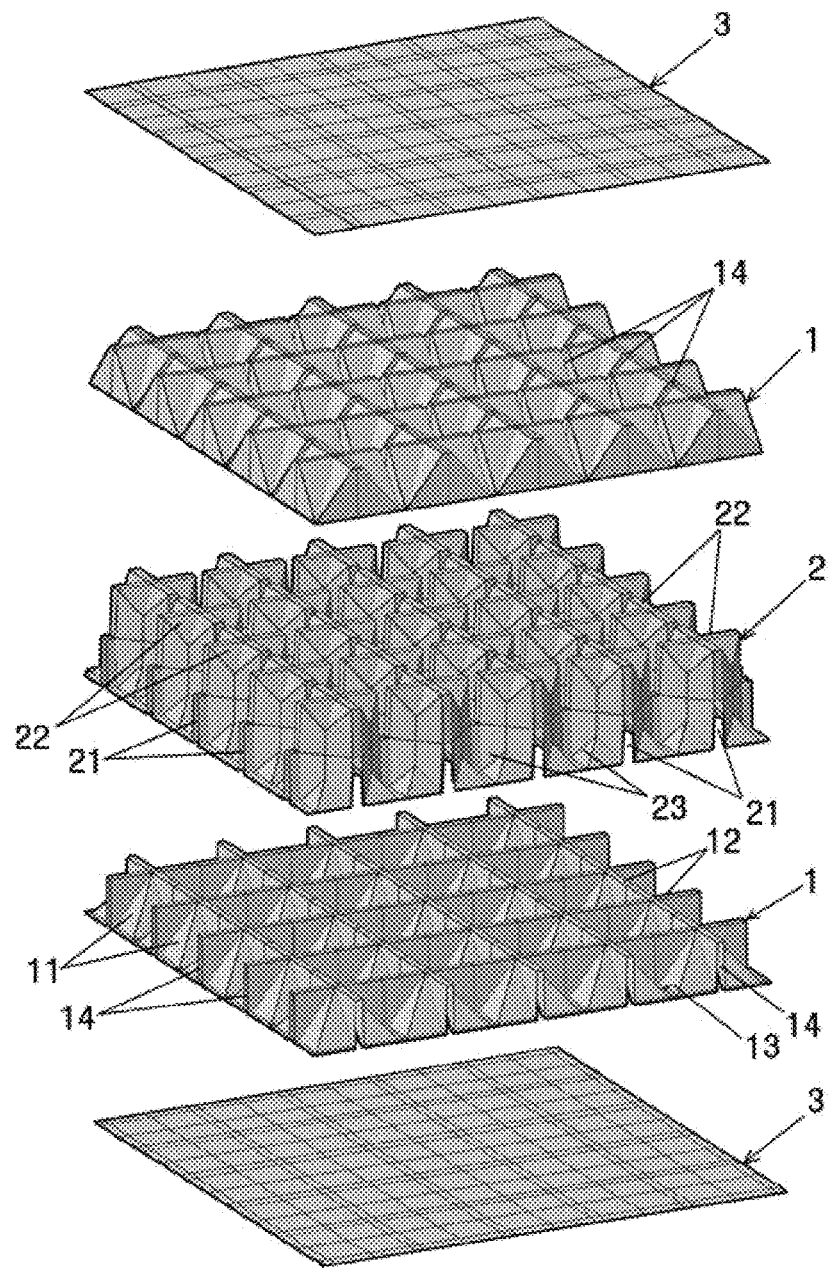
FIG. 5B is an exploded perspective view showing flat finish plates to be fixed.
Figure 5C:
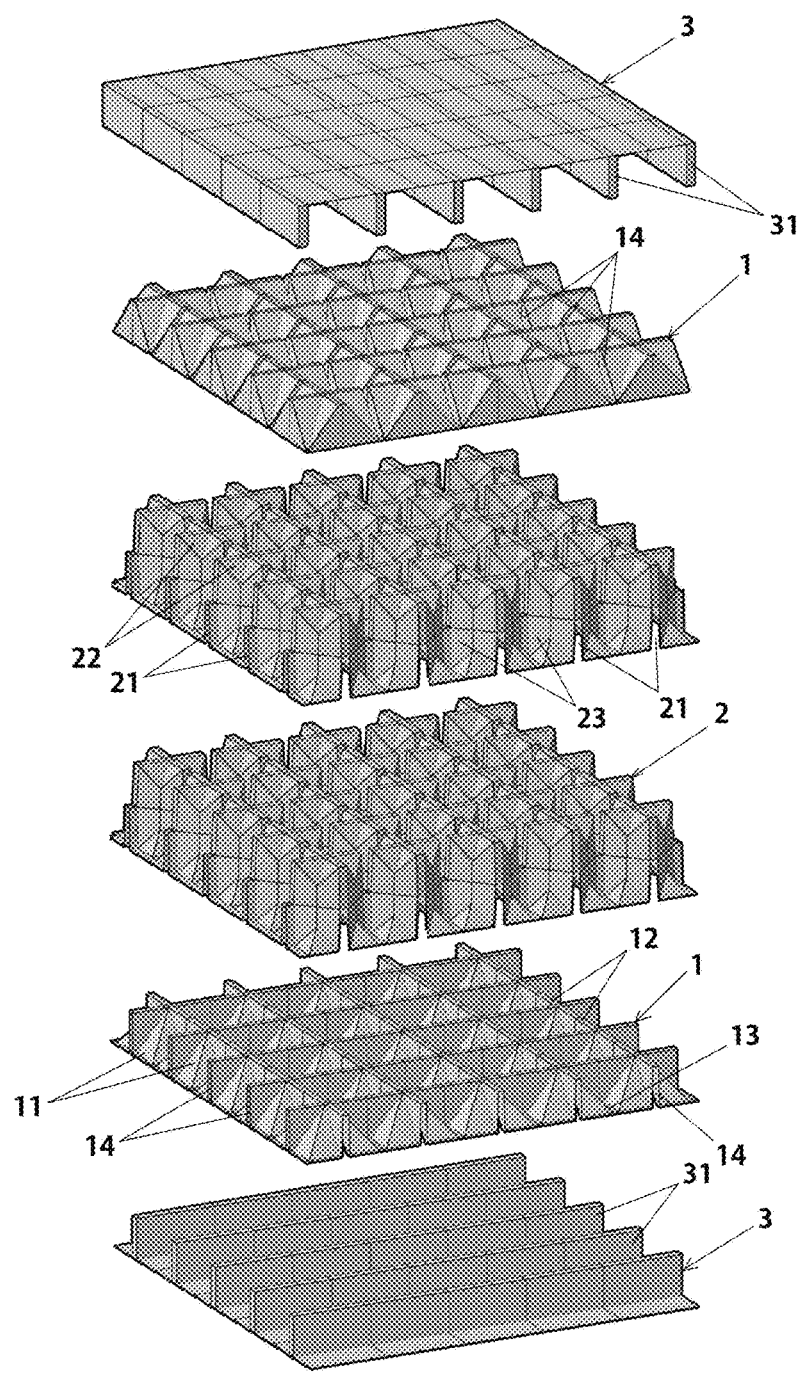
FIG. 5C is an exploded perspective view showing two intermediate reinforcing plates to be inserted.

The finish plates 3 are fixed to the top and bottom support plates 1 and 1' by the lattice-shaped grooves 15 on the top and the bottom of the top and bottom support plates 1 and 1'. When the finish plate 3 having the longitudinal projective insertions 31 is fixed to the upper support plate 1 and the other finish plate 3 having the lateral projective insertions 31 is fixed to the lower support plate 1', the strength is further increased, so even if large load is applied, it is possible to resist the load by distributing the load. Further, as shown in FIG. 5B, when the flat finish plates 3 can be bonded to the top and bottom support plates 1 and 1' by applying an adhesive to the flat cross projections 13, the multiple support wall structure A can be more easily manufactured.

Figure 6A:
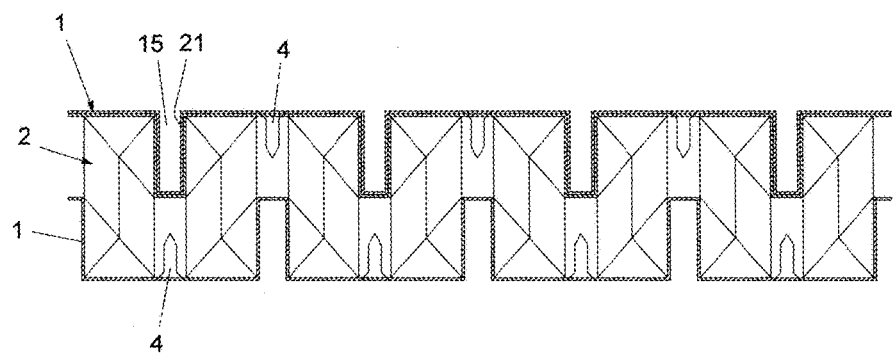
FIG. 6A is a vertical cross-sectional view of the multiple support wall structure that is fixed by bolts, according to the first embodiment of the present invention
Figure 6B:
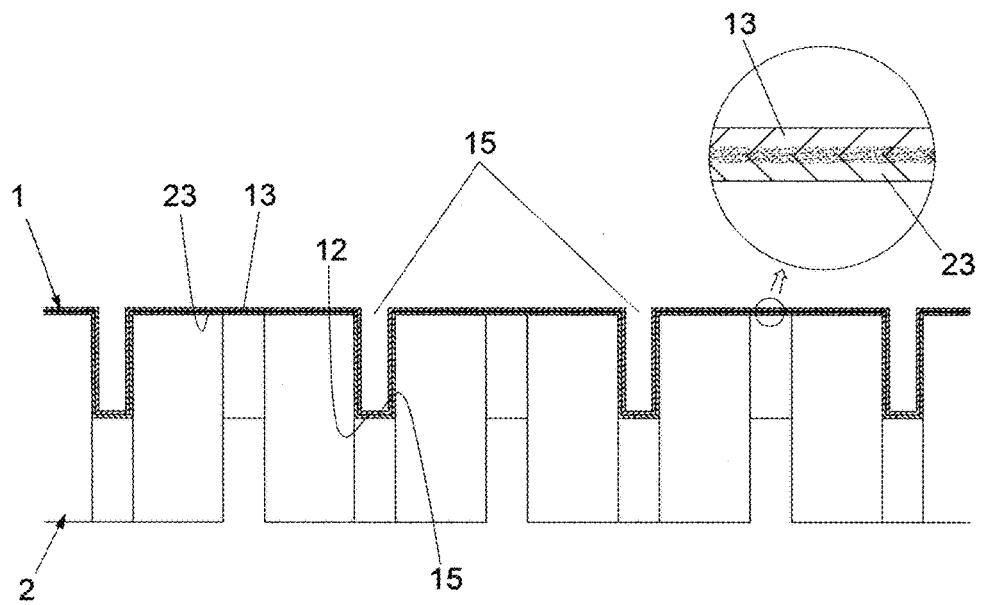
FIG. 6B is a cross-sectional view of the multiple support wall structure that is fixed by soldering, according to the first embodiment of the present invention.

The multiple support wall structure A according to the first embodiment of the present invention having the structure described above is assembled by applying an adhesive, fitting the lattice-shaped projections 12 in the top and bottom grooves 21 and 21', and the bonding them, but as shown in FIG. 6A, when the plates are made of different materials and difficult to bond, it may be possible to more strongly combine them using bolts 4. Alternatively, it may be possible to combine the plates by fitting the lattice-shaped projections 12 in the top and bottom grooves 21 and 21', fixing them with bolts 4, and then riveting or welding them. Further, as shown in FIG. 6B, it may be possible to solder the contact portion between the flat cross projections 13 of the top and bottom support plates 1 and 1' and the flat cross projections 23 of the intermediate reinforcing plate 2, with the lattice-shaped projections 12 fitted in the top and bottom grooves 21 and 21'.

Figure 7A:
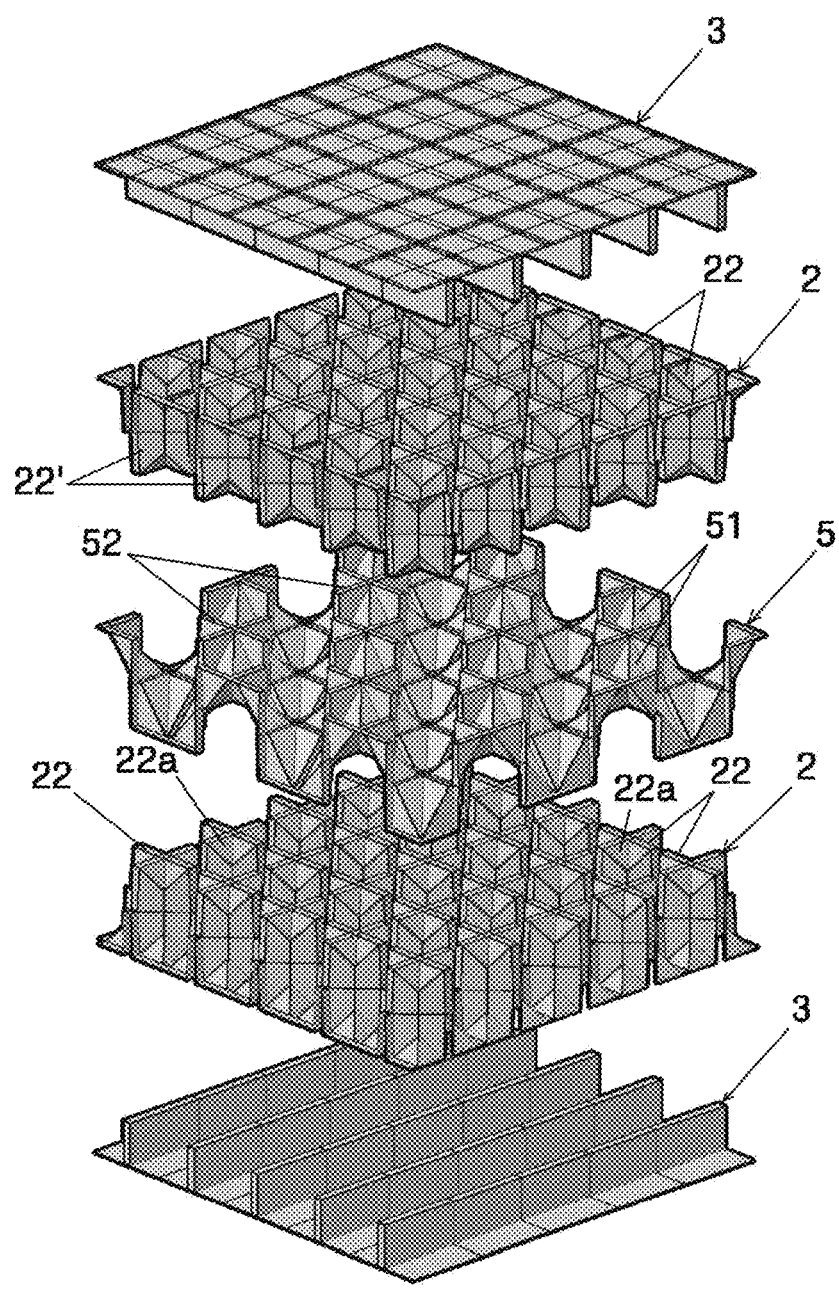
FIGS. 7A and 7B are an exploded perspective view of a multiple support wall structure according to a second embodiment of the present invention and a plan view of a center support member.

FIG. 7A is an exploded perspective view of a multiple support wall structure according to a second embodiment of the present invention in which a center support member 5 is disposed at the center to increase the strength of the multiple support wall structure, intermediate reinforcing plates 2 are disposed over and under the center support member 5, respectively, and finish plates 3 are coupled or bonded to the intermediate reinforcing plate 2, respectively.

In the center support member 5, top rectangular grooves 50 recessed downward to insert downward projective insertions 22' on the bottom of the intermediate reinforcing plate 2 over the center support member 5 are formed on the top, while bottom rectangular grooves 50' recessed upward to insert upward projective insertions 22 on the top of the intermediate reinforcing plate 2 under the center support member 5 are formed on the bottom of the center support member 5, so the center support member 5 has a double-fitting structure with the top rectangular grooves 50 and the bottom rectangular grooves 50' arranged in opposite directions.

Figure 7B:
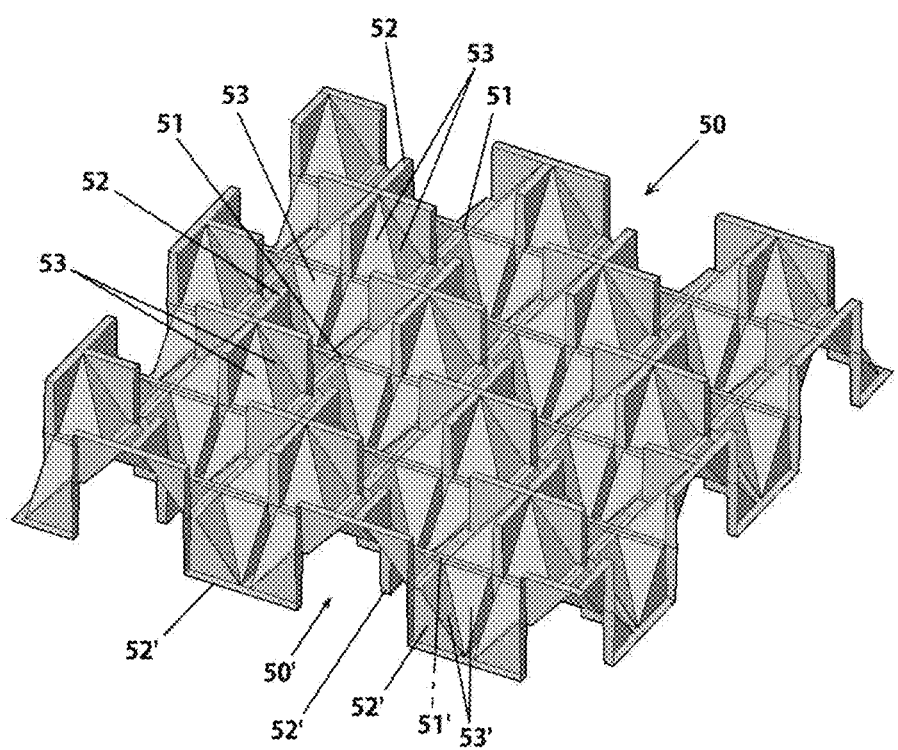

The top rectangular grooves 50 of the center support member 5, as shown in FIG. 7B, each have a cross groove 51 at the center, a cross projection 52 protruding diagonally upward from the cross groove 51, and slopes 53 extending from the cross groove 51 to the cross projection 52. The bottom rectangular grooves 50' of the center support member 5 each have a cross groove 51' at the center, a cross projection 52' protruding diagonally downward from the cross groove 51', and slopes 53' extending from the cross groove 51' to the cross projection 52'.

Accordingly, the top rectangular grooves 50 on the top of the center support member 5 are fitted on the downward projective insertion 22' of the intermediate reinforcing plate 2 under the center support member 5, and the bottom rectangular grooves 50' of the bottom of the center support member 5 are fitted on the upward projective insertion 22 of the intermediate reinforcing plate 2 under the center support member 5. That is, the cross projections 52 and 52' of the center support member 5 and the top and bottom grooves 21 and 21' of the intermediate reinforcing plates 2 are in surface contact with each other, while the slopes 53 and 53' of the center support member 5 and the slopes 24 of the upward and downward projective insertions 22 and 22' of the intermediate reinforcing members 2 are in surface contact with each other, whereby many surface contact portions are made. Accordingly, even if large load is applied to the multiple support wall structure A, the load can be distributed by the surface contact portions and the multiple support wall structure A can be made thick by the center support member 5.

The center support member 5 is also made of synthetic resin in the same way of molding the intermediate reinforcing plates 2.

Figure 8:
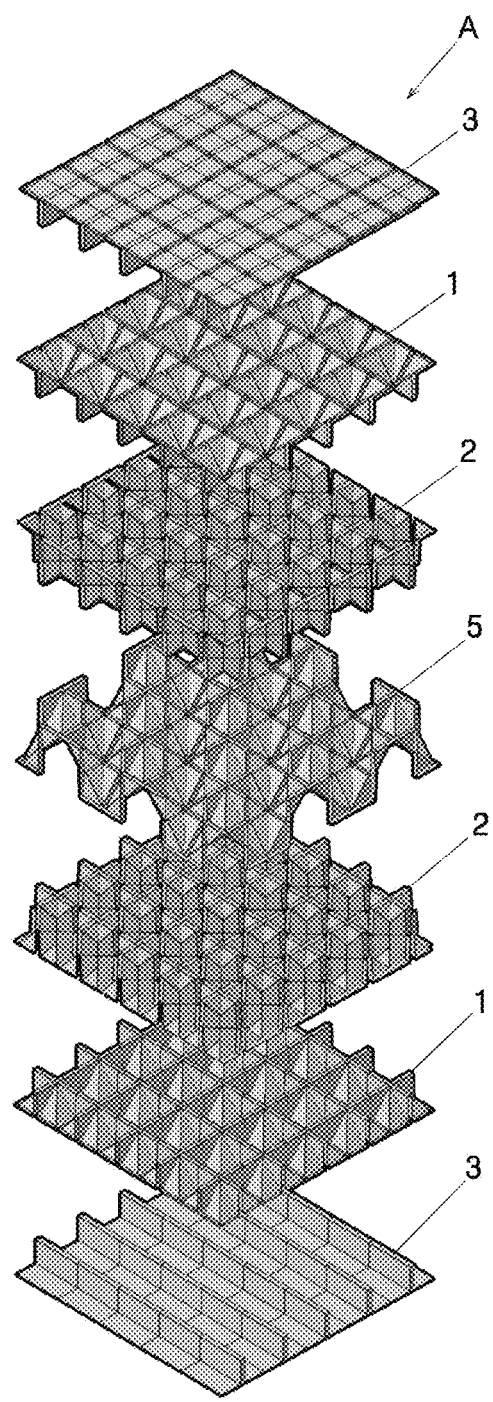
FIG. 8 is an exploded perspective view of a multiple support wall structure according to a third embodiment of the present invention.

FIG. 8 is an exploded perspective view of a multiple support wall structure A according to a third embodiment of the present invention, in which a center support member 5 is disposed at the center, intermediate reinforcing plates 2 are disposed over and under the center support member 5, respectively, top and bottom support plates 1 and 1' are disposed over and under the intermediate reinforcing plates 2, respectively, and finish plates 3 are coupled to the outer sides of the top and bottom support plates 1 and 1', respectively, whereby the multiple support wall structure can be made thick and the strength can be increased.

When it is required to make the multiple support structure A thicker, the thickness can be increased by doubly coupling couple the intermediate reinforcing plates 2 to the center support member 5, so it is possible to freely adjust the thickness.

Figure 9:
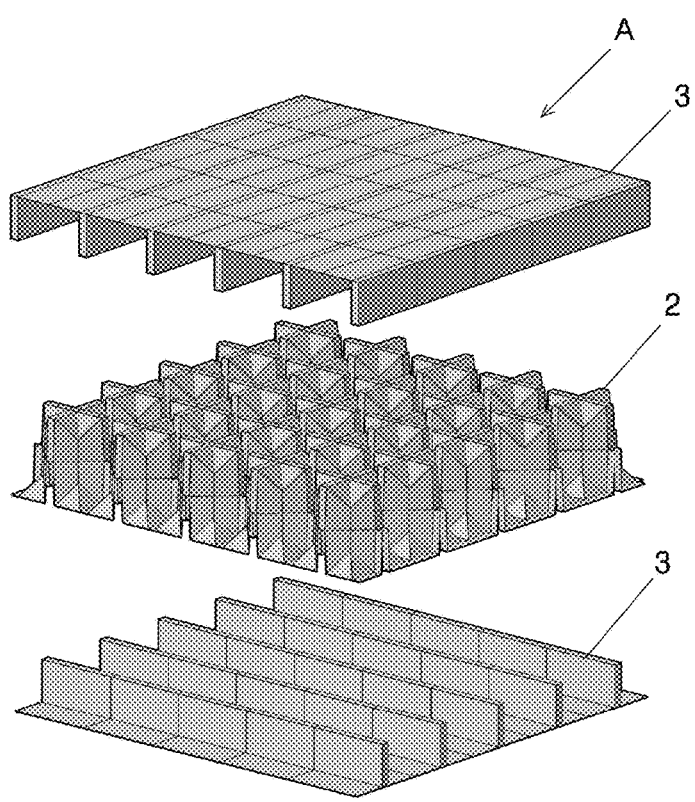
FIG. 9 is an exploded perspective view of a multiple support wall structure according to a fourth embodiment of the present invention.

FIG. 9 is an exploded perspective view of a multiple support wall structure A according to a fourth embodiment of the present invention, in which an intermediate reinforcing plate 2 is disposed at the center and finish plates 3 are fixed to the top and the bottom of the intermediate reinforcing plate 2, so a simple and strong multiple support wall structure can be achieved.

Figure 10:
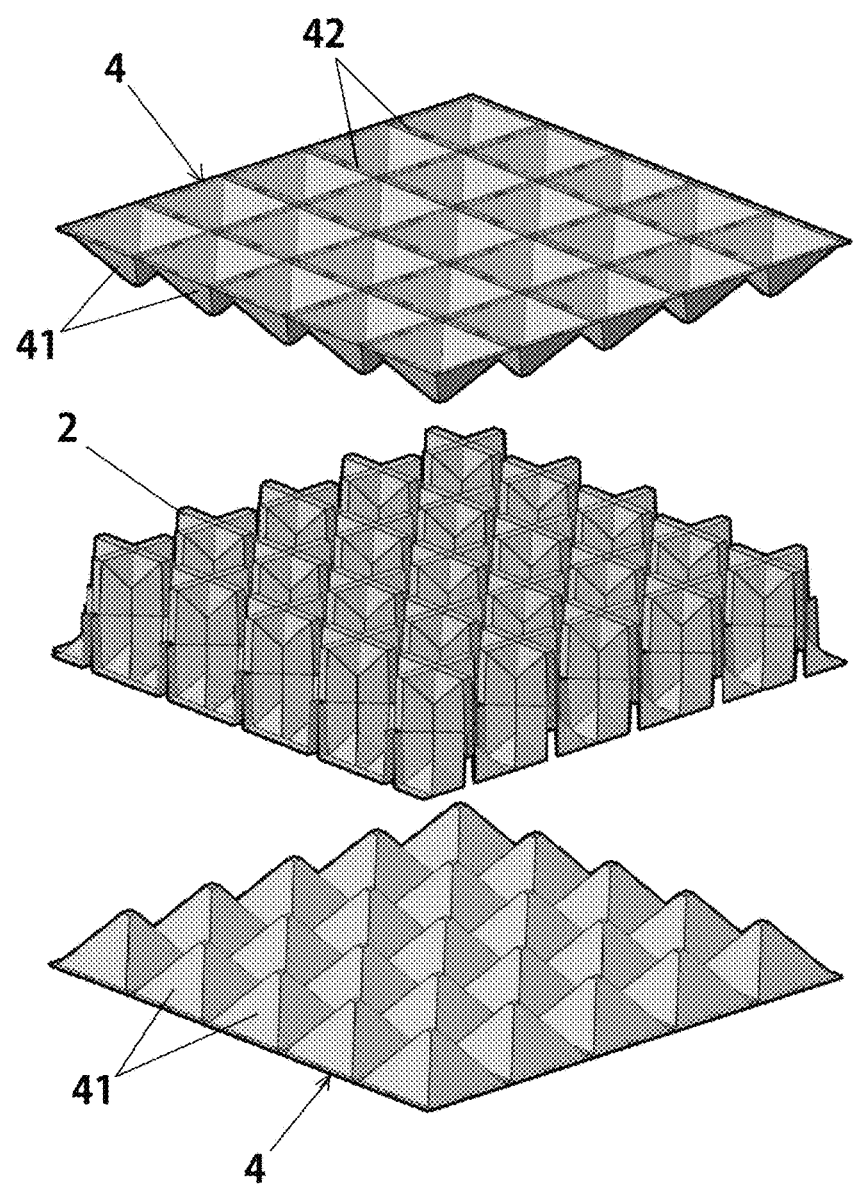
FIG. 10 is an exploded perspective view of a multiple support wall structure according to a fifth embodiment of the present invention.

FIG. 10 is an exploded perspective view of a multiple support wall structure A according to a fifth embodiment, in which an intermediate reinforcing plate 2 is disposed at the center and a pair of pyramidal cell support plates 4, which has a plurality of pyramidal cells 41 protruding on the top and the bottom, respectively, and lattice-shaped plane 42 on the opposite sides, is coupled to the top and the bottom of the intermediate reinforcing plate 2, respectively.

Figure 11A:
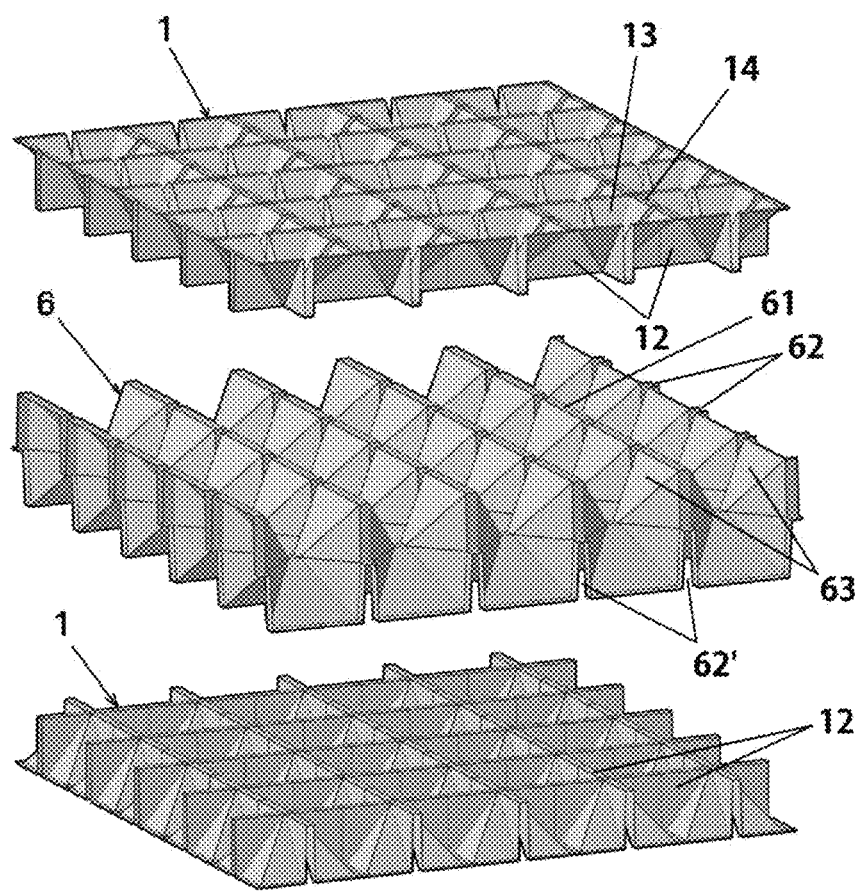
FIGS. 11A and 11B are an exploded perspective view of a multiple support wall structure according to a sixth embodiment of the present invention and a schematic perspective view of an intermediate insertion plate.

FIG. 11A is an exploded perspective view of a multiple support wall structure A according to a sixth embodiment of the present invention, in which an intermediate inserting member 6 is disposed at the middle portion and the top and bottom support plates 1 and 1' according to the first embodiment are fixed to the top and the bottom of the intermediate inserting member 6.

Figure 11B:
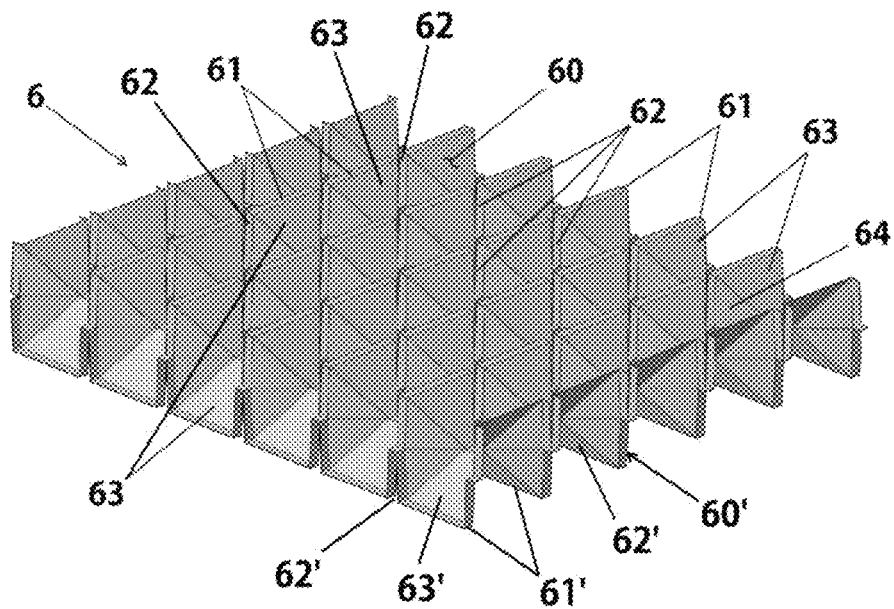

In the intermediate inserting member 6, as shown in FIG. 11B, a plurality of pyramidal projective cells 60 are laterally and longitudinally sequentially formed, straight line-shaped projections 61 horizontally protruding are formed at the middle portions of the pyramidal projective cells 60, grooves 62 are formed at both ends of each of the straight line-shaped projections 61, slopes 63 are formed at both sides of the straight line-shaped projections 61, and pyramid-side walls 64 are formed at the edges of the slopes 63 and have a triangular cross section that is smaller at the top. Further, pyramidal projective cells 60', which have straight line-shaped projections 61' protruding in the opposite direction and formed perpendicular to the straight line-shaped projections 61 are laterally and longitudinally sequentially formed at the joints of the pyramid-side walls 64. Accordingly, the pyramidal projective cells 60 having the straight line-shaped projections 61 are formed on a side of the intermediate inserting member 6 and the pyramidal projective cells 60' protruding in the opposite direction and having the straight line-shaped projections 61' formed perpendicular to the straight line-shaped projections 61 are laterally and longitudinally sequentially formed on the opposite side.

The intermediate inserting member 6 is also made of synthetic resin in the same way as the intermediate reinforcing plates 2.

Accordingly, when the lattice-shaped projections 12 of the top and bottom support plates 1 and 1' are inserted in the grooves 62 of the intermediate inserting member 6 over and under the intermediate inserting member 6, the straight line-shaped projections 61 of the pyramidal projective cells 60 are in contact with the bottoms of the flat cross projections 13 of the rectangular islands 11 and the slopes 63 are in contact with the slopes 14, thereby completing the multiple support walls structure according to the sixth embodiment of the present invention of which the strength is increased by a plurality of adjacent walls.

Figure 12:
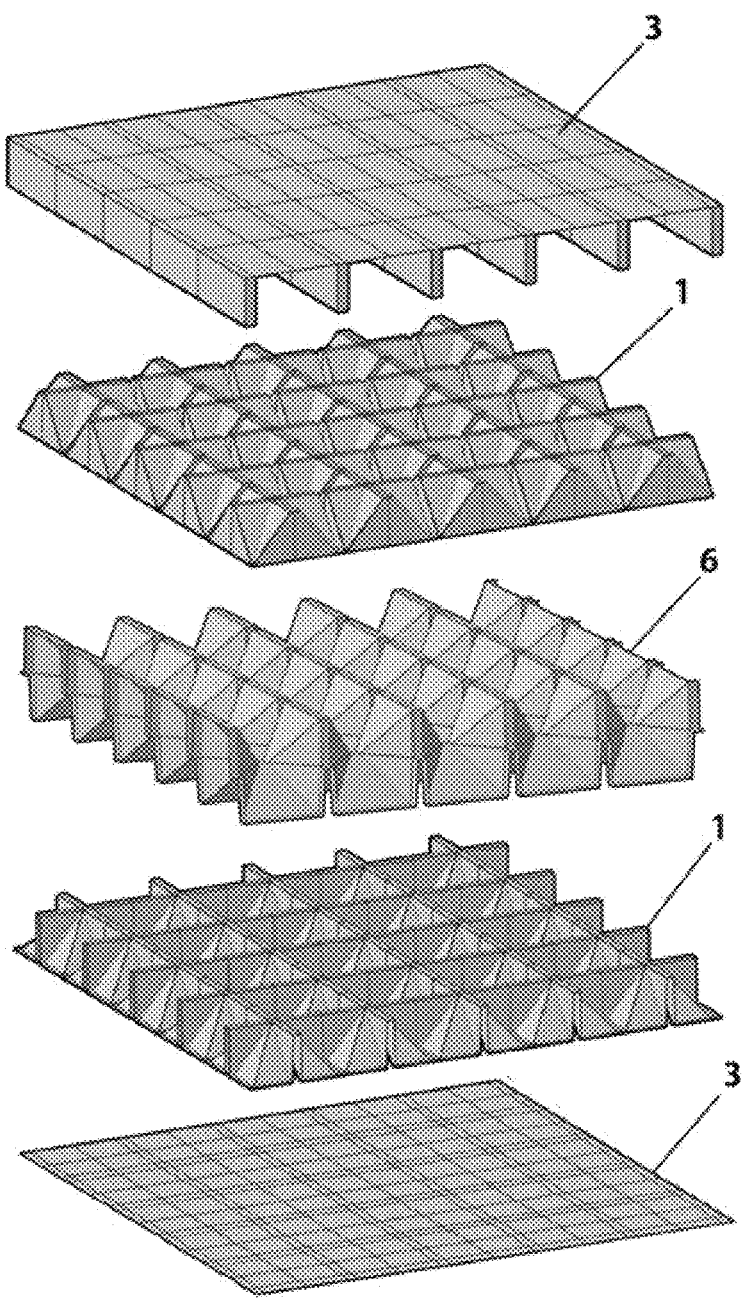
FIG. 12 is an exploded perspective view of a multiple support wall structure according to a seventh embodiment of the present invention.

In a multiple support wall structure A according to a seventh embodiment of the present invention, as shown in FIG. 12, an intermediate inserting member 6 is disposed at the middle portion, the top and bottom support plates 1 and 1' are fixed to the top and the bottom of the intermediate inserting member 6, respectively, and flat finish plates 3 are fixed to the outer sides of the upper and lower support plates 1 and 1', respectively, so a simple and strong multiple support wall structure can be achieved.

According to the multiple support wall structures A of the present invention, the strength is larger and the weight is smaller than plywood or other plates and a high insulation effect can be achieved by many spaces in the multiple structures. Accordingly, the structures can be used for vertical walls of a building requiring insulation such as a glasshouse, so they can provide high insulation effects. Further, the structures can provide high soundproof or sound-blocking effects, so they can be used for not only the walls of buildings, but also for separation walls in airplanes or ships, and can be used for various other purposes. Furthermore, the structures can be directly assembled without specific post-processes, so installation time, manpower for installation, and installation costs are reduced.

INDUSTRIAL APPLICABILITY

The multiple support wall structures of the present invention can be repeatedly manufactured as the same products in the field of manufacturing support wall structures, so the structures have high industrial applicability.

The invention claimed is:

1. A multiple support structure (A) comprising:
a top support plate (1) having a plurality of rectangular projective islands (11) separated by lattice-shaped projections (12) protruding in the shape of a go board, the plurality of rectangular projective islands (11) protruding upward in an opposite direction to the lattice-shaped projections (12);
an intermediate reinforcing plate (2) having upward projective insertions (22) protruding in a shape corresponding to the rectangular projective islands (11) to fit the rectangular projective islands (11) of the top support plate (1), having top grooves (21) formed laterally and longitudinally between the upward projective insertions (22) to fit the lattice-shaped projections (12), having downward projective insertions (22') formed in the same shape as but in an opposite direction to the upper projective insertions (22) in spaces diagonally adjacent to the upper projective insertions (22), and having bottom grooves (21') formed laterally and longitudinally between the downward projective insertions (22');
a bottom support plate (1') formed in the same shape as the top support plate (1) and having a plurality of rectangular projective islands (11') that is separated by lattice-shaped projections (12') protruding in the shape of a go board wherein the plurality of rectangular projective islands (11') protrude downward in an opposite direction to the lattice-shaped projections (12') to be fitted on the downward projective insertions (22'); and
wherein lattice-shaped grooves (15) are formed on a top and a bottom of the top and bottom support plates (1, 1') to correspond to the lattice-shaped projections (12), and flat finish plates (3) having a plurality of projective insertions (31) that is inserted in the lattice-shaped grooves (15) are bonded to tops of the flat cross projections (13) of the top and bottom support plate (1, 1') or the projective insertions (31) are fitted in the lattice-shaped grooves (15) to finish the top and bottom support plates (1, 1').

2. The structure of claim 1, wherein the rectangular islands (11, 11') of the top and bottom support plates (1, 1') protrude in an assembly direction and are laterally and longitudinally sequentially arranged, flat cross projections (13, 13') protruding in the assembly direction are formed on tops and bottoms of the rectangular islands (11, 11'), respectively, and a plurality of slopes (14, 14') is formed at sides of the flat cross projections (13, 13') toward edges of the rectangular islands (11, 11').

3. The structure of claim 1, wherein in each of the upward projective insertions (22) of the intermediate reinforcing plate (2), a flat cross projection (23) protruding in a shape corresponding to the flat cross projection (13), except at edges, is formed to be fitted in the flat cross projection (13) on the top of the rectangular island (11), and slopes (24) inclined toward the edges are formed at the sides of the flat cross projections (23), a plurality of slopes (24) inclined upward is formed at each of the upward projective insertions (22), and four outer sides around the upward projective insertions (22) are formed in a diamond shape.

4. The structure of claim 1, wherein the downward projective insertions (22') and the upward projective insertions (22) of the intermediate reinforcing plate (2) protrude in opposite directions to correspond to each other.

* * * * *